United States Patent [19]

Kemner et al.

[11] Patent Number: 5,586,030
[45] Date of Patent: Dec. 17, 1996

[54] SYSTEM AND METHOD FOR MANAGING ACCESS TO A RESOURCE IN AN AUTONOMOUS VEHICLE SYSTEM

[75] Inventors: Carl A. Kemner, Peoria Heights; Craig L. Koehrsen, Peoria; Joel L. Peterson, East Peoria, all of Ill.

[73] Assignee: Caterpillar Inc., Peoria, Ill.

[21] Appl. No.: 328,329

[22] Filed: Oct. 24, 1994

[51] Int. Cl.⁶ .................................................. G06F 165/00
[52] U.S. Cl. ........................... 364/424.027; 364/424.07; 340/909
[58] Field of Search ......................... 364/424.02, 424.07; 340/989–994; 180/167–169; 318/587; 395/859

[56] References Cited

U.S. PATENT DOCUMENTS

| | | | |
|---|---|---|---|
| 4,084,228 | 4/1978 | Dufond et al. | 364/200 |
| 4,839,835 | 6/1989 | Hagenbuch | 364/567 |
| 4,950,118 | 8/1990 | Mueller et al. | 414/274 |
| 4,986,384 | 1/1991 | Okamoto et al. | 180/167 |
| 5,202,832 | 4/1993 | Lisy | 364/424 |
| 5,265,257 | 11/1993 | Simcoe et al. | 395/725 |
| 5,390,125 | 2/1995 | Sennott et al. | 364/449 |

FOREIGN PATENT DOCUMENTS

| | | |
|---|---|---|
| 1167143 | 10/1969 | United Kingdom . |
| WO91/09375 | 6/1991 | WIPO . |
| WO91/09275 | 6/1991 | WIPO . |

OTHER PUBLICATIONS

Pincock, Allen & Holt, Inc.; Tucson, AZ; *Computer Directed Truck Dispatch System;* May 1982.

Gould, Inc.; *Automatic Truck Dispatching And Identification System;* Sep. 1980.

Special Report: Energy In Mining; *Automatic Truck Dispatching Increasing Productivity;* pp. 40–43; Date Unknown.

Japan–Patent Abstract; vol. 16, No. 241 (P–1363) "Method for Controlling Unmanned Truck" Jun. 1992.

Okawa, Yukio et al., "Vehicle Control of Unmanned Dump Trucks," International Off–Highway and Powerplant Congress and Exposition, Sep. 1992.

*Primary Examiner*—Michael Zanelli
*Attorney, Agent, or Firm*—Sterne, Kessler, Goldstein and Fox

[57] ABSTRACT

The invention is a system and method for managing a resource shared by a plurality of autonomous vehicles. Each vehicle includes a navigator for causing the vehicle to travel a specified route to the resource and for generating a queue position request upon approach to the resource. A queue or fleet manager establishes a queue to control access to the resource. The queue manager generates a queue position in response to receipt of the queue position request from an approaching vehicle. Under control of the queue manager, autonomous vehicles are passed through the queue and allowed to access the resource in a first-in, first-out manner.

40 Claims, 7 Drawing Sheets

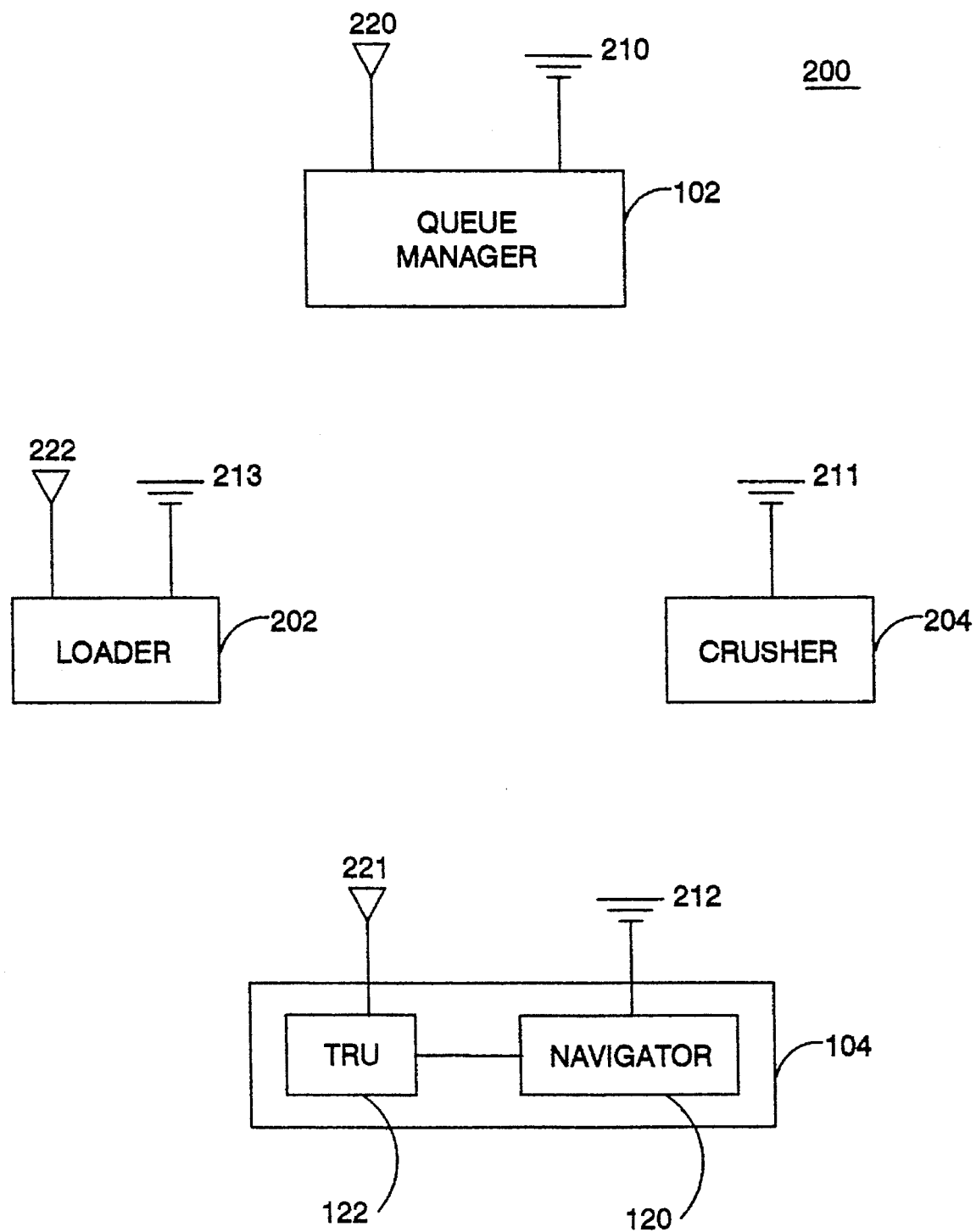
Fig_2_

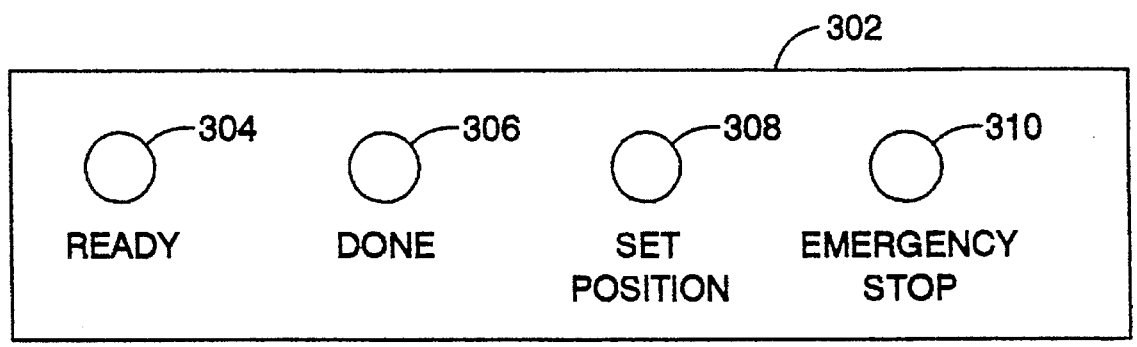
Fig_3_
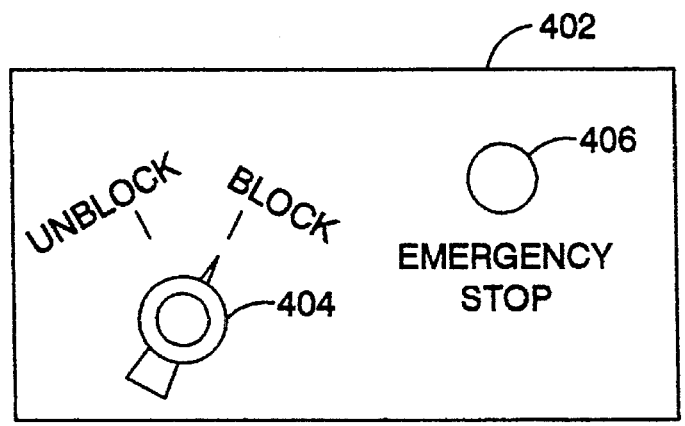
Fig_4_
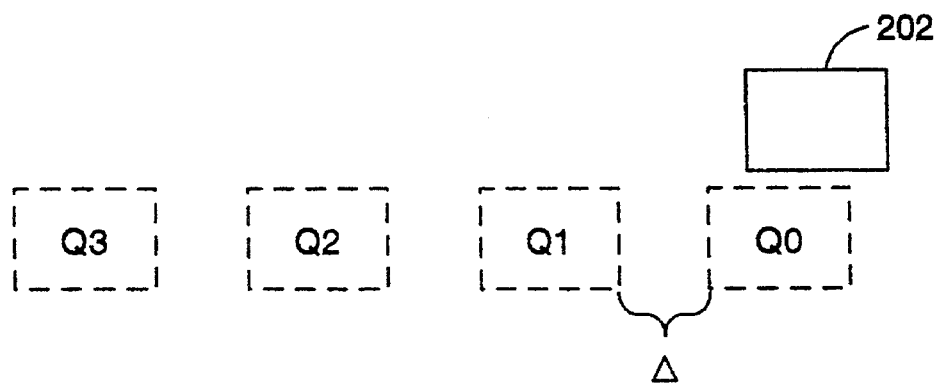
Fig_7_

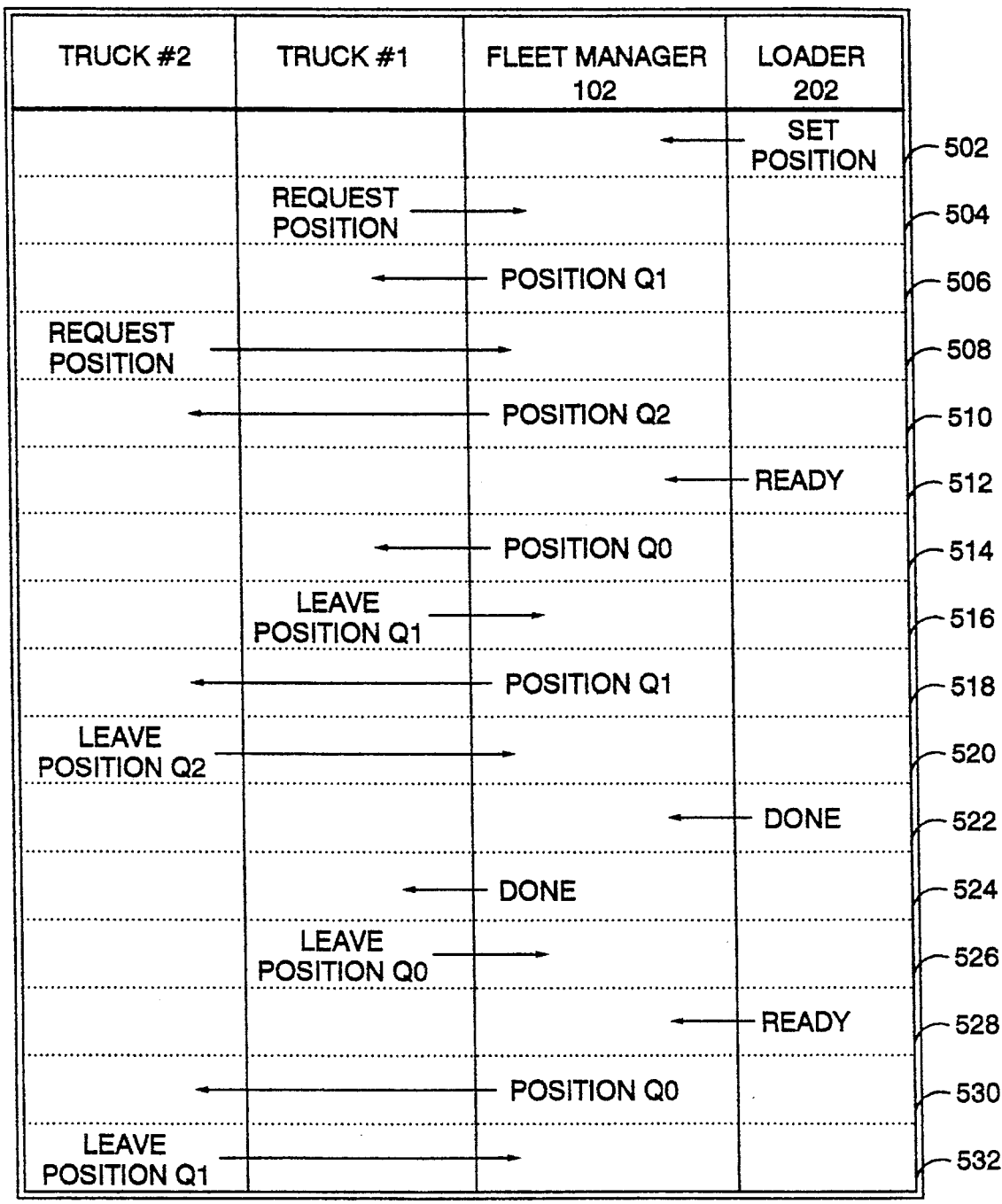
Fig_5_

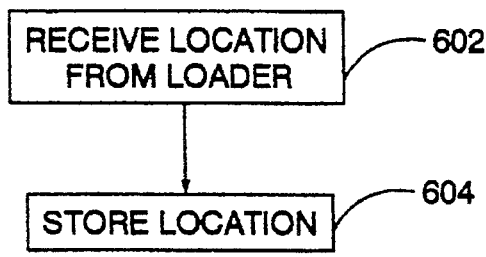
Fig_6_
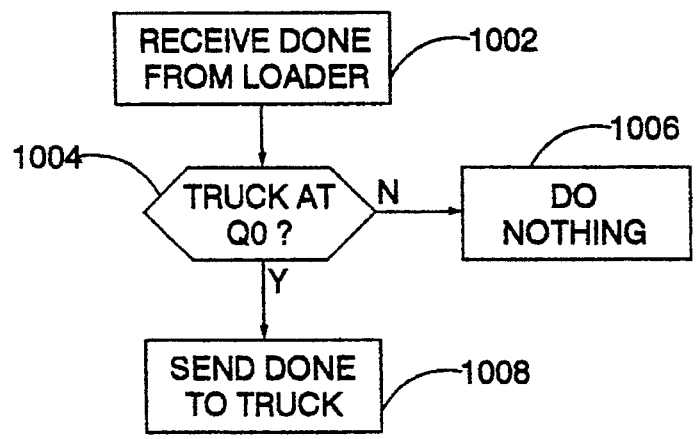
Fig_10_
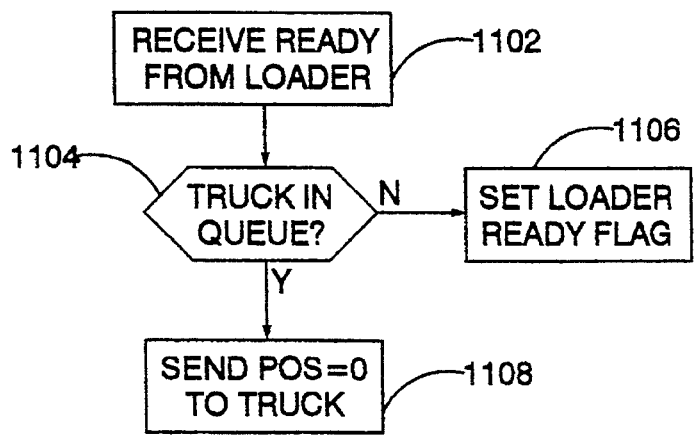
Fig_11_

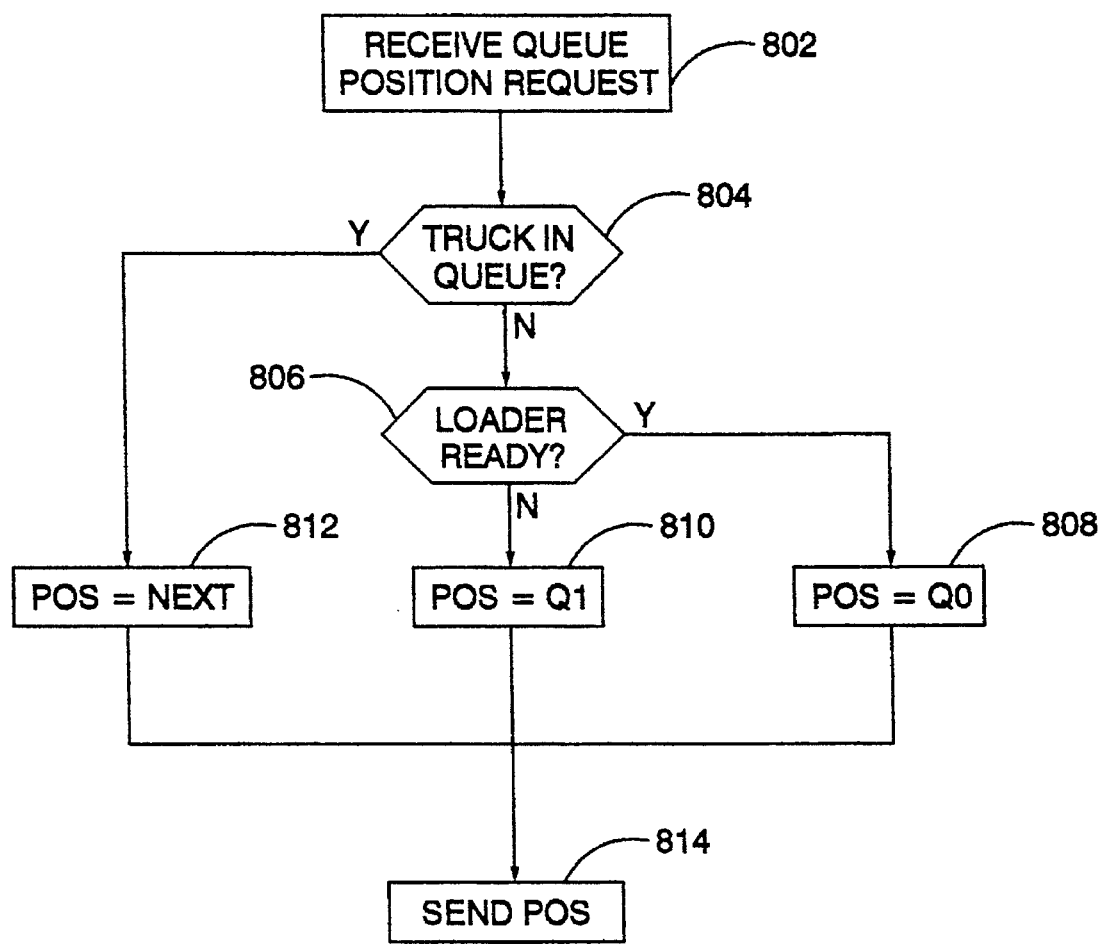
Fig_8_

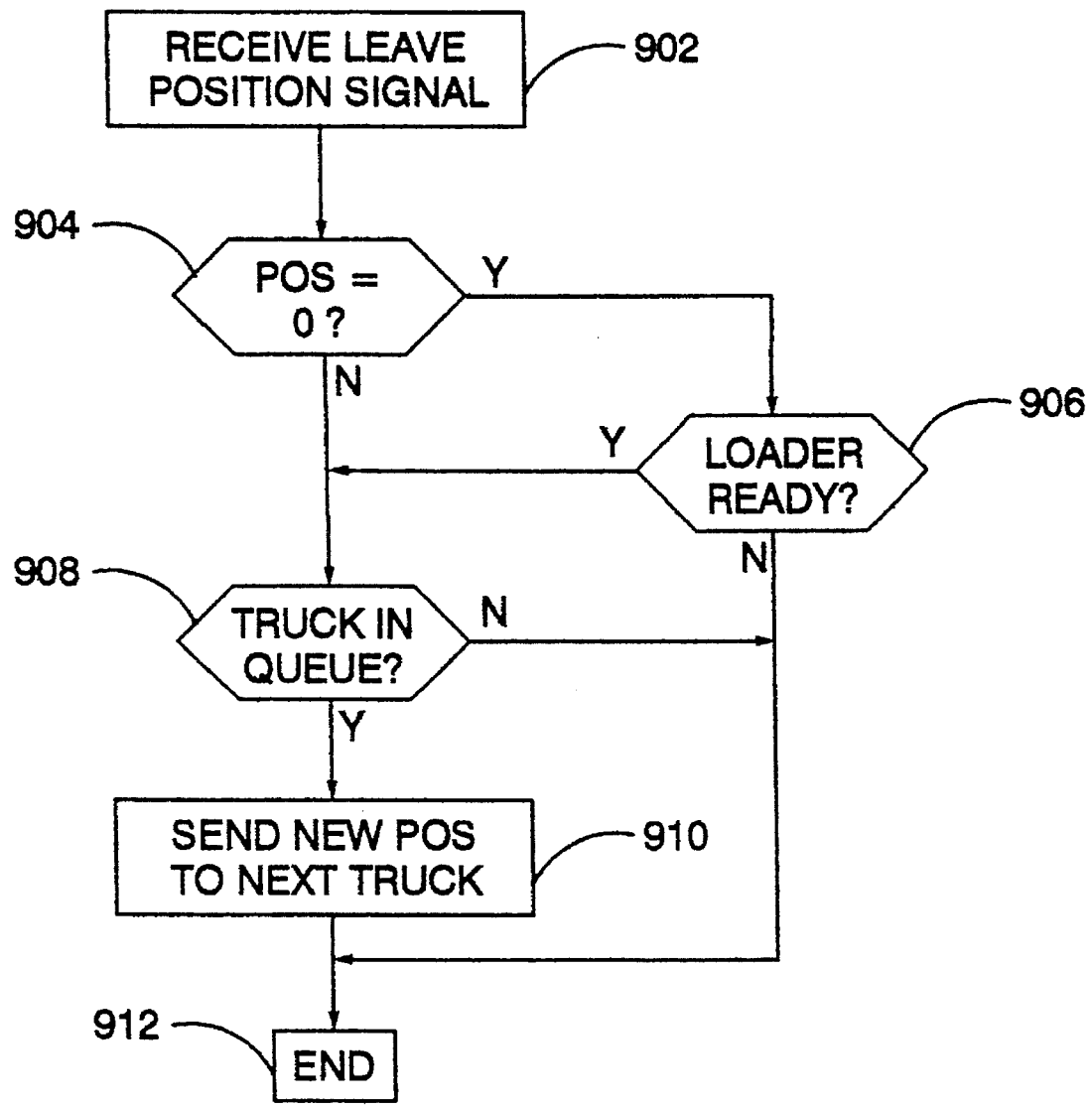
Fig_9_

SYSTEM AND METHOD FOR MANAGING ACCESS TO A RESOURCE IN AN AUTONOMOUS VEHICLE SYSTEM

BACKGROUND OF THE INVENTION

1. Field of the Invention

This invention relates generally to managing resources in an autonomous vehicle system and, more particularly, to a system and method for managing access to a resource, such as a wheel loader, by a plurality of autonomous vehicles, such as autonomous dump trucks.

2. Related Art

Caterpillar Inc. of Peoria, Ill., manufactures off-road mining vehicles. For example, the Caterpillar 777C is an off-road mining truck. Commonly owned, U.S. patent application Ser. No. 08/019,540, now U.S. Pat. No. 5,390,125 filed Feb. 18, 1993, "Vehicle Position Determination System and Method," the full text of which is incorporated herein by reference, discloses an autonomous vehicle system for use with a mining vehicle such as the 777C truck. Such an autonomous vehicle system may be used, for example, to implement an autonomous mining operation. For example, a plurality of autonomous dump trucks can haul rock from an excavation site to a crusher site in an open pit mining operation.

In such a mining system, the excavation site and the crusher represent limited resources which must be shared between the plurality of dump trucks. It is desired to manage the trucks and the resources so that operation of the autonomous mining system is optimized.

SUMMARY OF THE INVENTION

The invention is a system and method for managing a resource shared by a plurality of autonomous vehicles. Each vehicle includes a navigator for enabling the vehicle to travel a specified route to the resource and for generating a queue position request upon approach to the resource. A queue or fleet manager establishes a queue to control access to the resource. The queue manager generates a queue position in response to receipt of the queue position request from an approaching vehicle. Under control of the queue manager, autonomous vehicles are passed through the queue and allowed to access the resource in a first-in, first-out manner.

The preferred embodiment of the invention is in the environment of an autonomous mining operation in which a plurality of autonomous dump trucks haul rock (or some other material) between an excavation site (e.g., a wheel loader) and a processing site (e.g., a crusher). The queue manager establishes a first queue to control access to the loader and a second queue to establish access to the crusher.

The loader queue operates as follows. A truck approaching the loader will communicate a queue position request to the queue manager. The queue manager will respond with a queue position. The truck will assume the assigned queue position within the queue. The queue position is assigned to the approaching truck based on a number of other trucks in the queue.

An operator of the loader will communicate a resource ready signal to the queue manager when it is ready to receive a truck from the queue. In response to the resource ready signal, the queue manager will allow a first truck in a first position of the queue to access the loader.

When the first truck in the queue leaves the first queue position to access the resource, the truck will communicate a depart position signal to the queue manager. In response to the depart position signal, the queue manager updates the position of the next truck in the queue. As each truck moves, the process repeats until the position of every truck in queue has been updated.

The navigator of the truck knows that it is approaching the crusher as a result of detecting a queue trigger in the specified route being traveled. The queue trigger is detected and processed by the navigator when a truck reference unit indicates that the truck has reached the position of the queue trigger along the route being followed. In response to the queue trigger, the truck communicates the queue position request to the queue manager.

When the loader has finished loading a truck, a loader operator will cause a done signal to be sent to the queue manager. In response to the done signal, the queue manager will instruct the truck to leave the loader and resume following its route under fully autonomous control.

Operation of the crusher queue is similar to the loader queue. However, the crusher need not involve an operator to control flow of trucks through the queue. The queue manager will move trucks through the queue to dump their loads into the crusher without operator intervention. If desired, however, an operator may send a block queue signal to the queue manager. In response to the block queue signal, the queue manager will prevent trucks in the queue from accessing the crusher.

The foregoing and other features and advantages of the invention will be apparent from the following, more particular description of a preferred embodiment of the invention, as illustrated in the accompanying drawings.

BRIEF DESCRIPTION OF THE FIGURES

FIG. 2 is a high level block diagram of an autonomous mining system 200 according to the invention;

FIG. 3 shows a control panel for a wheel loader in the autonomous mining system of the invention;

FIG. 4 shows a control panel for a crusher in the autonomous mining system of the invention;

FIG. 5 is a table illustrating communications between a queue manager, a loader and two trucks in managing a shared resource queue in accordance with the invention;

FIG. 6 is a flow chart illustrating operation of a queue manager of the invention in response to a set position signal from a loader;

FIG. 7 illustrates a shared resource queue according to the invention;

FIG. 8 is a flow chart illustrating operation of a queue manager of the invention in responding to a request queue position signal from a truck;

FIG. 9 is a flow chart illustrating operation of a queue manager of the invention in responding to a leave position signal from a truck;

FIG. 10 is a flow chart illustrating operation of a queue manager of the invention in responding to a done signal from a loader; and FIG. 11 is a flow chart illustrating operation of a queue manager of the invention in responding to a ready signal from a loader.

DETAILED DESCRIPTION OF THE PREFERRED EMBODIMENT

Figure 1:
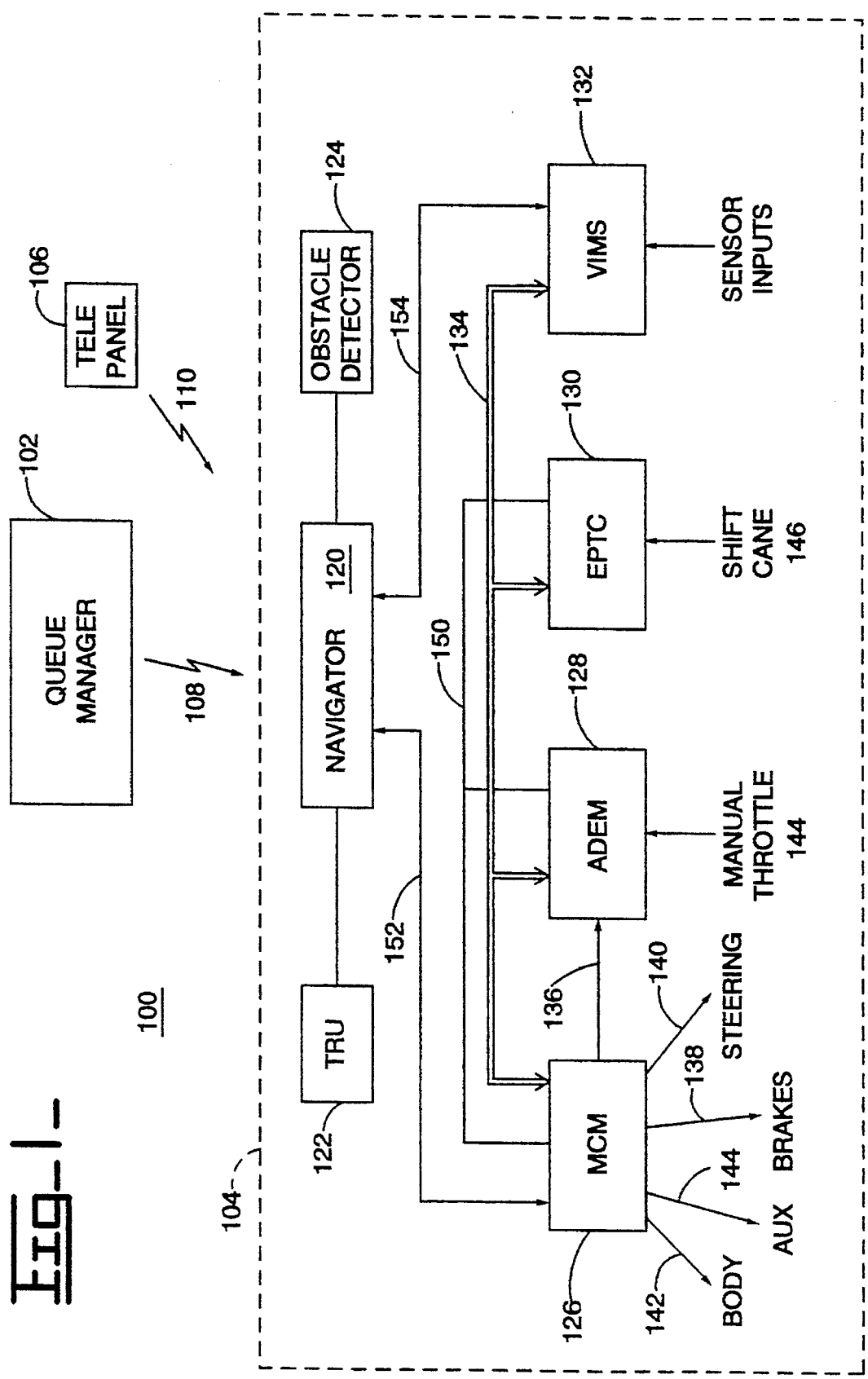
FIG. 1 is a high level block diagram showing the autonomous vehicle system of the invention.

The preferred embodiment of the invention is discussed in detail below. While specific part numbers and configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. In addition, the left-most digit of each reference number indicates the figure in which the number is first used.

The invention is a method and system for managing a resource shared by a plurality of autonomous vehicles in an autonomous vehicle system. The preferred embodiment of the invention is described in the environment of an open pit mining operation in which a plurality of autonomous mining trucks haul rock from a loader site to a crusher site. The shared resources include, for example, a wheel loader which loads the trucks and a crusher into which the trucks dump their payloads of rock. This environment is useful for illustrating the structure and operation of the invention. However, the invention is not limited to an autonomous mining operation. Upon reading the present disclosure, it will be apparent to a person skilled the relevant art how to implement the invention in other autonomous vehicle environments.

System Overview

FIG. 1 is a high level block diagram showing an autonomous vehicle system 100. Autonomous vehicle system 100 includes a fleet or queue manager 102 and a vehicle control system 104. System 100 may also include a tele-operation panel 106 as discussed in further detail below.

Queue manager 102 is configured to manage a fleet of autonomous mining vehicles 104 such as dump trucks. Queue manager 102 acts like a foreman, assigning tasks to the trucks and tracking their progress as they perform these tasks. Queue manager 102 communicates with each truck via a radio link 108. In the preferred embodiment, queue manager 102 is located at a base station near the open pit mining operation.

Each truck includes an on-board control system that permits autonomous operation under the control of queue manager 102. The on-board control system includes a navigator 120, a truck reference unit (TRU) 122, an obstacle detector 124, a machine control module (MCM) 126, and advanced diesel engine manager (ADEM) 128, an electronic programmable transmission control (EPTC) 130, and a vital information management system (VIMS) 132.

Navigator 120 receives instructions from queue manager 102 via radio link 108. The instructions include, for example, a work assignment or task. From the task, navigator 120 determines a route to be followed. The route may be, for example, a haul segment between an excavation site and a crusher site in an open pit mining operation.

TRU 122 determines the actual position of the vehicle using the global positioning system (GPS) and a plurality of sensors (e.g., a steering angle sensor, a vehicle speed sensor, a heading sensor). TRU 122 is described in detail in the commonly owned, co-pending U.S. patent application Ser. No. 08/327,864, filed on even date herewith, entitled "System and Method for Precisely Determining an Operating Point for an Autonomous Vehicle," the full text of which is incorporated herein by reference.

Based on the actual position and the desired route, navigator 120 generates a desired steering angle and a desired speed for the vehicle. Obstacle detector 124 is a radar unit which scans the area in front of the vehicle for obstacles. When obstacle detector 124 detects an obstacle, it provides an indication that an obstacle is detected and/or the location of the obstacle to navigator 120. Navigator 120 may then stop the vehicle or navigate around the obstacle.

Tele-operation panel 106 may be used to communicate, via radio signals as indicated at 110, steer angle, speed and other commands directly to navigator 120 to allow remote control operation of the vehicle.

Operation of navigator 120 and obstacle detector 124 are described in detail in the '540 application which is incorporated by reference above. Operation of tele-operation panel 106 is described in detail in the commonly owned, co-pending U.S. patent application Ser. No. 08/299,448, now U.S. Pat. No. 5,448,479, filed on Sep. 1, 1994, entitled "Remote Control System and Method for an Autonomous Vehicle," the full text of which is incorporated herein by reference.

Navigator 120, TRU 122 and obstacle detector 124 represent on-board intelligence for the vehicle which allows autonomous control commands to be generated in the form of the speed and steering angle request signals. Before autonomous operation can be achieved, however, these commands or requests must be serviced.

The steering and speed requests, among others, are serviced by MCM 126. MCM 126 receives the steering and speed requests from navigator 120 over a data bus 152. Over this same data bus, MCM 126 provides status and diagnostic information for the vehicle systems (e.g., steering, brakes, dump body, engine, transmission, etc.) to navigator 120. MCM 126 controls the vehicle with the aid of ADEM 128 and EPTC 130. MCM 126 provides monitoring and diagnostic information to navigator 120 with the aid of VIMS 132. In addition, VIMS 132 provides monitoring and diagnostic information directly to navigator 120 over a data bus 154.

ADEM 128 controls the speed or RPM (revolutions per minute) of the vehicle's engine. EPTC 130 controls gear selection in the transmission and ensures that the transmission is in the correct gear. VIMS 132 monitors different systems of the vehicle. Operation and structure of MCM 126, ADEM 128, EPTC 130 and VIMS 132 are described in commonly owned, co-pending U.S. patent application Ser. No. 08/299,447, now U.S. Pat. No. 5,469,356, filed Sep. 1, 1994, titled "System for Controlling a Vehicle to Selectively Allow Operation in Either an Autonomous Mode or a Manual Mode," the full text of which is incorporated herein by reference.

FIG. 2 is a high level block diagram of an autonomous mining system 200 according to the present invention. A mining truck 104 hauls rock from a loader site, represented by loader 202, to a crusher site, represented by crusher 204. When a plurality of trucks 104 are hauling material between loader 202 and crusher 204, a high level control must be maintained to resolve conflicts between the trucks and to assure efficient sharing of the resources (e.g., the loader and the crusher). This high level control is provided by queue manager 102.

Queue manager 102 manages access to these resources by establishing a queue at each resource. For example, a loader queue is established at loader 202 and a crusher queue is established at crusher 204. Queue manager 102 communicates with loader 202, crusher 204 and trucks 104 via a radio communications link. The radio communications link is illustrated in FIG. 1 by reference number 108 and in FIG. 2 by antennas to 210–213. Antenna 210 is connected to a radio (not shown) of queue manager 102. Similarly, antennas 211, 212 and 213 are attached to radios (not shown) of crusher 204, truck 104 and loader 202, respectively.

In the preferred embodiment of the autonomous mining system, queue manager 102 is a general purpose computer or workstation. The features of the queue manager are performed in software programmed into the computer. Queue manager 102 further includes a GPS receiver and antenna 220 for producing differential corrections for a GPS receiver of TRU 122, represented by GPS antenna 221, and for a GPS receiver of loader 202, represented by GPS antenna 222. Differential GPS corrections are communicated from queue manager 102 to truck 104 and loader 202 via a second radio link (not shown).

In the preferred embodiment, queue manager 102 communicates with loader 202, crusher 204 and trucks 104 via antennas 210–213. All communications between loader 202, trucks 104 and crusher 204 are routed through queue manager 102. Thus, there are no direct communications between trucks 104 and resources 202, 204. In an alternate embodiment, direct communications may be implemented from loader 202 and crusher 204 to trucks 104.

Communications between loader 202 and trucks 104 are described with reference to FIG. 3. FIG. 3 illustrates a control panel 302 for loader 202. In the preferred embodiment, loader 202 is manned by an operator. Control panel 302 includes four operator actuated switches. These include a ready switch 304, a done switch 306, a set position switch 308 and an emergency stop switch 310. Actuation of ready switch 304 sends a ready signal to queue manager 102 over the radio communications link. The ready signal indicates to queue manager 102 that the loader is ready to receive an autonomous truck for loading. Operator actuation on done switch 306 sends a done signal to queue manager 102 over the radio communications link. The done signal indicates to queue manager 102 that loader 202 is finished loading a truck.

Operator actuation of set position switch 308 will send a set position signal to queue manager 102 over the radio communications link. The set position signal indicates the current position of the loader to queue manager 102. As discussed in further detail below, this feature is used to set a loader position from which all loader queue positions are referenced. Operator actuation of emergency stop switch 310 will send an emergency stop signal to queue manager 102 via the radio communications link. The emergency stop signal requests that all trucks currently being serviced by loader 202 be immediately brought to a stop.

FIG. 5 is a table illustrating communications between queue manager 102, loader 202 and autonomous trucks 104 in managing the loader queue. Each row of the table corresponds to a step illustrating operation of the loader queue. The first column of the table represents communications with a truck #2. The second column of the table represents communications with a truck #1. The third column of the table represents communications with queue manager 102. The fourth column of the table represents communications with loader 202.

In a step 502, loader 202 sends a set position signal to queue manager 102. Queue manager 102 will store the position indicated by the set position signal in a memory. This is illustrated in FIG. 6. In a step 602 queue manager 102 receives the location of the loader. In a step 604, queue manager 102 stores the loader position in memory. This position of the loader is used by queue manager 102 as a desired location for a truck to be loaded. This position is referred to as "queue position 0" or simply "Q0". Q0 may or may not actually be a position in the queue. All other queue positions are determined relative to the Q0 position set by loader 202. That is, each queue position is represented as the position of Q0 (e.g., as a north position and an east position with respect to a reference point) and an offset from Q0. This is illustrated in FIG. 7.

In FIG. 7, position Q0 is illustrated as being adjacent to loader 202. Position Q1 is offset from position Q0 by an offset $\Delta$ (e.g., 50 meters) along the path. Similarly, position Q2 is offset from position Q0 by a distance $2\Delta$ (e.g., 100 meters) and position Q3 is offset from position Q0 by a distance $3\Delta$ (e.g., 150 meters). Determining the queue positions in this manner allows loader 202 to move the loader queue as desired.

Referring again to FIG. 5, a first truck (e.g., truck #1) approaches loader 202. As truck #1 nears the position of loader 202, a queue trigger (i.e., an object or action item) programmed into the route being followed by the truck will instruct the truck to request a queue position from queue manager 102. In response to the request position signal from truck #1, queue manager 102 transmits a queue position to truck #1 in a step 506. In this example, because no other trucks are in the queue, the position assigned to truck #1 is position Q1.

As described above, upon approaching a queue, a truck will transmit a request queue position signal to queue manager 102. The truck does this in response to a queue trigger. The queue trigger is located within a route file stored in memory in navigator 120. Navigator 120 enables the truck to follow a predetermined path as indicated by the route file. Path tracking is accomplished by comparing the actual truck position (as determined by TRU 122) with the desired position within the route and then computing speed and steering angle values required to track the path. The request queue position signal is generated when the queue trigger in encountered in the route file.

In a step 508, a truck #2 approaches the loader queue and, in response to reaching the queue trigger in its route, transmits a request position signal to queue manager 102. In response, queue manager 102 transmits a position Q2 to truck #2 in a step 510. The operation of queue manager 102 in assigning this queue position to truck #2 is illustrated in FIG. 8.

Referring now to the flow chart of FIG. 8, the queue position request signal from a truck is received in a step 802. In a step 804, the queue manager checks to determine whether there are any trucks currently in the queue. If there are trucks in the queue, then the queue manager assigns the next available queue position to the truck in step 812. For example, in FIG. 5, truck #1 is already in position Q1. Therefore, truck #2 is assigned position Q2. In a step 814, the assigned queue position is transmitted to the requesting truck.

If, at step 804, it is determined that there are no other trucks in the queue then the method proceeds to step 806. At step 806, the queue manager checks to determine whether the loader is ready by checking a loader ready status flag within the queue manager. If the loader is not ready, then the truck is assigned position Q1. If the loader is ready, then the truck is assigned position Q0 in a step 808. As discussed above, position Q0 is the position which permits the truck to access the loader.

Referring back to FIG. 5, with position Q2 being assigned to truck #2, position Q2 is transmitted to the truck in a step 510. Trucks #1 and #2 will remain in these queue positions until a ready signal is received from loader 202. This is illustrated in step 512 where the ready signal is transmitted to queue manager 102 by loader 202. In response to receiving the ready signal, queue manager 102 transmits a position Q0 to truck #1 in a step 514. This will enable truck #1 to leave position Q1 and to access the loader at position Q0. As truck #1 leaves position Q1, it transmits a leave position Q1 signal to queue manager 102 in a step 516. In response to this acknowledgement that truck #1 is leaving position Q1, queue manager 102 transmits a new position to truck #2 in a step 518. This new position is the next available position in the queue (i.e., position Q1).

This method by which queue manager 102 updates queue positions is illustrated further in the flow chart of FIG. 9. In a step 902, the leave position signal from a truck (e.g., truck #1) is received by queue manager 102. In step 904, it is determined whether the position being vacated is position Q0. If position Q0 is being vacated, then the method proceeds to step 906 where the loader ready flag is checked. If the loader is not ready then the method ends at step 912 without updating the position of any truck in the queue. If the position being vacated by the truck at step 904 is position Q0, and the loader is ready (as indicated by the loader ready flag) at step 906, then the method proceeds to step 908 where it is determined whether there are any additional trucks in the queue. If there are no additional trucks in the queue, then the method ends at step 912. If there are additional trucks in the queue, then a new queue position is sent to the next truck in the queue in a step 910. Returning to step 904, if the queue position currently being vacated is not position 0, then the method proceeds to step 908 as described above.

Referring again to FIG. 5, in a step 520, truck #2 signals the queue manager 102 that it is leaving position Q2. Truck #2 then assumes its newly assigned position at Q1. In a step 522, the operator of the loader indicates that he is finished loading the current truck (e.g., truck #1) by depressing done switch 306 of control panel 302 (see FIG. 3). This enables a done signal to be transmitted from loader 202 to queue manager 102. In response to the done signal, queue manager 102 transmits a similar done signal in a step 524 to truck #1 in position Q0. In a step 526, truck #1 transmits a leave position Q0 signal to queue manager 102 in response to the done signal.

Operator actuation of ready switch 304 of control panel 302 in loader 202 (see FIG. 3) will enable a ready signal to be transmitted from loader 202 to queue manager 102. This is illustrated in steps 512 and 528. In response to the ready signal of step 528, queue manager 102 sends a position Q0 signal in step 530 to the vehicle currently in position Q1 (e.g., truck #2). In response to the position Q0 signal, truck #2 will leave position Q1 and will send a leave position Q1 signal to queue manager 102 in step 532.

FIG. 10 illustrates response of queue manager 102 to receipt of a done signal from loader 202. Receipt of the done signal is illustrated at step 1002. In a step 1004, it is determined whether there is a truck positioned at position Q0. If no truck is positioned at Q0, then queue manager 102 takes no further action as illustrated at step 1006. If, however, a truck is positioned at Q0, then a done signal is sent to the truck as indicated at step 1008. The done signal indicates to the truck that loading is complete and that it may resume autonomous operation and leave the queue.

FIG. 11 illustrates operation of queue manager 102 in handling a ready signal from loader 202. In a step 1102, the ready signal is received from loader 202. In step 1104, it is determined whether there is a truck in the queue. If a truck is present in the queue, queue manager 102 sends position Q0 to the truck in a step 1108. If no truck is present in the queue, then a loader ready flag is set within queue manager 102 in a step 1106. The loader ready flag indicates that upon entry of a truck into the queue, queue manager 102 may immediately assign position Q0 to the truck.

The loader queue is described in detail above to illustrate the structure and operation of the invention. Operation of the crusher queue is substantially identical to that of the loader queue except for the following differences. The crusher queue represents a fixed position resource. Thus, it is not necessary for queue position Q0 to be moved. Further, trucks can dump their loads into the crusher much quicker than a truck can be loaded at the loader. Thus, the crusher queue can be allowed to run freely under control of queue manager 102 without operator intervention.

Upon approach to the crusher queue, a queue trigger in the route file will instruct navigator 120 of the truck to send a queue position request signal to queue manager 102. Queue manager 102 will return a next available queue position to the truck. If no trucks are currently in the queue, a position of Q0 may be assigned to the truck. This will allow the truck to directly access the crusher without being slowed down by the queue.

Updating queue positions in the crusher queue is done in substantially the same manner as the loader queue. Queue manager 102 will advance the position of a truck in the crusher queue whenever a next closer position is vacated. This will happen without operator input. However, provision is made for preventing vehicles from accessing the crusher queue. In the preferred embodiment of the crusher queue, a crusher operator may block truck access to the crusher. Communications between crusher 204 and trucks 104 are described with reference to FIG. 4.

FIG. 4 illustrates a control panel 402 of crusher 204. In the preferred embodiment, control panel 402 includes a rotary switch 404 and an emergency stop switch 406. Rotary switch 404 is used to block trucks in the crusher queue from leaving the queue and accessing crusher 204. Emergency stop switch 406 is used to produce an emergency stop signal for all vehicles in the crusher queue. As with control panel 302 of loader 202, all signals from control panel 402 are sent to queue manager 102 over the radio communications link. Thus, while operator intervention at the crusher queue is not required, it is permitted.

The invention has been described in the environment of a autonomous mining system. The resources shared in such a system include a wheel loader at an excavation site and a rock crusher at a processing site. Queues are set-up and managed by the queue manager to control truck access to the resources. As will be apparent to a person skilled in the relevant art, however, the invention may be used to manage a shared resource in other environments.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A system for managing a resource shared by a plurality of autonomous vehicles, comprising:

navigator means, on each autonomous vehicle, for enabling each autonomous vehicle to travel a specified route to the resource and for generating a queue position request upon approach to the resource; and queue manager means for establishing a queue to control access to the resource, and for generating a queue position in response to receipt of said queue position request from an approaching autonomous vehicle, whereby said plurality of autonomous vehicles pass through said queue and access said resource in a first-in, first-out manner.

2. The system of claim 1, wherein a first position of said queue is collocated with the resource.

3. The system of claim 2, further comprising:

communication means for communicating said queue position to said approaching autonomous vehicle.

4. The system of claim 3, wherein said navigator means comprises:

means for detecting a queue trigger in the specified route being traveled by said approaching autonomous vehicle when position determining means in said approaching autonomous vehicle indicates that said approaching autonomous vehicle has reached said queue trigger; and means for generating said queue position request in response to said queue trigger.

5. The system of claim 1, further comprising:

ready means for generating a resource ready signal;

move means responsive to said resource ready signal for instructing an autonomous vehicle in a first position of said queue to depart said first position to access said resource.

6. The system of claim 5, further comprising:

first communication means for communicating said queue position to said approaching autonomous vehicle; and second communication means for communicating said resource ready signal to an autonomous vehicle in a first position of said queue.

7. The system of claim 6, wherein said queue manager means further comprises:

means for updating positions of other autonomous vehicles in said queue in response to said autonomous vehicle in said first position of said queue departing said first position.

8. The system of claim 7, wherein said navigator means comprises:

means for detecting a queue trigger in the specified route being traveled by said approaching autonomous vehicle when position determining means in said approaching autonomous vehicle indicates that said approaching autonomous vehicle has reached said queue trigger; and means for generating said queue position request in response to said queue trigger.

9. The system of claim 8, wherein said queue position communicated to said approaching autonomous vehicle from said queue manager means comprises a resource position and a number of autonomous vehicles in said queue, and wherein said navigator means further comprises means for calculating said queue position from said resource position, said number of autonomous vehicles in said queue and the specified route.

10. The system of claim 9, wherein said ready means comprises: an operator-actuated switch at said resource.

11. The system of claim 10, further comprising:

means for generating a done signal upon completion of said access to said resource by said autonomous vehicle; and means, on said autonomous vehicle, for instructing said autonomous vehicle at said resource to leave said resource in response to said done signal.

12. A method for managing a resource shared by a plurality of autonomous vehicles, each autonomous vehicle having navigator means for enabling the autonomous vehicle to travel a specified route to the resource, the method comprising:

(a) establishing a queue to control access to the resource;

(b) communicating a queue position request from an approaching autonomous vehicle to a queue manager upon approach of said approaching autonomous vehicle to the resource;

(c) communicating a queue position from said queue manager to said approaching autonomous vehicle in response to said queue position request, said queue position being assigned to said approaching autonomous vehicle based on a number of other autonomous vehicles in said queue;

(d) communicating a resource ready signal to a first autonomous vehicle in a first position of said queue; and (e) allowing, in response to said resource ready signal, said first autonomous vehicle to leave said first position of said queue and to access said resource.

13. The method of claim 12, further comprising:

(f) communicating a depart position signal from said first autonomous vehicle to said queue manager upon departure of said first autonomous vehicle from said first position of said queue; and (g) updating positions of other autonomous vehicles in said queue in response to said depart queue position signal.

14. The method of claim 12, wherein said step (b) of communicating a queue position request comprises:

detecting a queue trigger in the specified route being traveled by said approaching autonomous vehicle;

processing said queue trigger when positioning means in said approaching autonomous vehicle indicates that said approaching autonomous vehicle has reached said queue trigger; and communicating said queue position request from said approaching autonomous vehicle to said queue manager.

15. The method of claim 12, wherein said step (c) of communicating a queue position comprises:

communicating a resource position and a number of autonomous vehicles in said queue to said approaching autonomous vehicle; and calculating said queue position from said resource position, said number of autonomous vehicles in said queue and the specified route.

16. The method of claim 12, wherein said step (d) of communicating a resource ready signal comprises:

communicating said resource ready signal from said resource to said queue manager; and communicating said resource ready signal from said queue manager to said first autonomous vehicle.

17. The method of claim 12, wherein said step (d) of communicating a resource ready signal comprises:

communicating said resource ready signal directly from said resource to said first autonomous vehicle.

18. The method of claim 12, wherein said step (e) of allowing comprises:

allowing said first autonomous vehicle to leave said first position of said queue;

stopping said first autonomous vehicle at said resource; and allowing said resource to act on said vehicle.

19. The method of claim 18, further comprising the steps after step (e) of:
  (h) communicating a done signal from said resource to said queue manager upon completion of said resource acting on said first autonomous vehicle; and
  (i) communicating said done signal from said queue manager to said first autonomous vehicle.

20. The method of claim 18, further comprising the step after step (e) of:
  (h) communicating a done signal from said resource to said first autonomous vehicle upon completion of said resource acting on said first autonomous vehicle.

21. The method of claim 13, wherein said step (g) of updating comprises, for each autonomous vehicle in said queue:
  advancing a next autonomous vehicle in said queue by one queue position upon receipt of a depart queue position signal from an autonomous vehicle directly preceding said next autonomous vehicle in said queue.

22. A system for managing a resource shared by a plurality of autonomous vehicles, comprising:
  navigator means, on each autonomous vehicle, for enabling each autonomous vehicle to travel a specified route to the resource and for generating a queue position request upon approach to the resource;
  queue manager means the establishing a queue to control access to the resource, and for generating a queue position in response to receipt of said queue position request from an approaching autonomous vehicle;
  first communication means for communicating said queue position to said approaching autonomous vehicle, wherein said navigator means instructs said approaching autonomous vehicle to take said queue position;
  ready means for generating a resource ready signal;
  second communication means for communicating said resource ready signal to an autonomous vehicle in a first position of said queue; and
  move means responsive to said resource ready signal for instructing said autonomous vehicle in said first position of said queue to depart said first position to access said resource.

23. The system of claim 22, wherein said queue manager means further comprises:
  means for updating positions of other autonomous vehicles in said queue in response to said autonomous vehicle in said first position of said queue departing said first position.

24. The system of claim 22, wherein said navigator means comprises:
  means for detecting a queue trigger in the specified route being traveled by said approaching autonomous vehicle when position determining means in said approaching autonomous vehicle indicates that said approaching autonomous vehicle has reached said queue trigger; and
  means for generating said queue position request in response to said queue trigger.

25. The system of claim 22, wherein said queue position communicated to said approaching autonomous vehicle from said queue manager means comprises a resource position and a number of autonomous vehicles in said queue, and wherein said navigator means further comprises means for calculating said queue position from said resource position, said number of autonomous vehicles in said queue and the specified route.

26. The system of claim 25, wherein said ready means comprises: an operator-actuated switch at said resource.

27. The system of claim 26, wherein said second communication means comprises:
  means for communicating said resource ready signal from said switch to said queue manager means; and
  means for communicating said resource ready signal from said queue manager to said autonomous vehicle in said first position of said queue.

28. The system of claim 26, wherein said second communication means comprises:
  means for communicating said resource ready signal directly from said switch to said autonomous vehicle in said first position of said queue.

29. The system of claim 22, further comprising:
  means for generating a done signal upon completion of said access to said resource by said autonomous vehicle; and
  means, on said autonomous vehicle, for instructing said autonomous vehicle at said resource to leave said resource in response to said done signal.

30. A system for loading a plurality of autonomous dump trucks at a loader site, comprising:
  navigator means, on each autonomous dump truck, for enabling each autonomous dump truck to travel a specified route to the loader site and for generating a queue position request upon approach to the loader site;
  queue manager means for establishing a queue to control access to the loader site, and for generating a queue position in response to receipt of said queue position request from an approaching autonomous dump truck, wherein said navigator means instructs said approaching autonomous dump truck to take said queue position; and
  loader site control means for generating a loader ready signal when said loader site is ready to receive one of said plurality of autonomous dump trucks and a loader done signal when said loader site has finished with said one of said plurality of autonomous dump trucks, said loader ready signal instructing an autonomous dump truck in a first position of said queue to depart said first position to access said
  loader site, said loader site done signal instructing an autonomous dump truck at said loader site to leave said loader site.

31. The system of claim 30, further comprising:
  communication means for providing communications between said navigator means and said queue manager means and between said loader site control means and said navigator means.

32. The system of claim 31, wherein said communication means comprises:
  first radio providing communications between said navigator means and said queue manager means; and
  second radio providing communications between said queue manager means and said loader site control means.

33. The system of claim 30, wherein said queue position communicated to said approaching autonomous dump truck from said queue manager means comprises a loader site position and a number of autonomous dump trucks in said queue, and wherein said navigator means further comprises means for calculating said queue position from said loader site position, said number of autonomous dump trucks in said queue and the specified route.

34. The system of claim 30, wherein said loader site is a wheel loader and wherein said loader control means comprises:

a first operator-actuated switch to produce said loader ready signal;

a second operator-actuated switch to produce said loader done signal; and a third operator-actuated switch to produce an emergency stop signal to stop one of said plurality of autonomous dump trucks.

35. The system of claim 34, wherein said loader site control means further comprises:

position determining means for determining a position of said wheel loader; and a fourth operator actuated switch for setting said loader site position based on said position determined by said position determining means.

36. The system of claim 30, wherein said loader site control means further comprises:

position determining means for determining a position of said loader site; and means for setting said loader site position based on said position determined by said position determining means.

37. A system for unloading a plurality of autonomous dump trucks at a dump site, comprising:

navigator means, on each autonomous dump truck, for enabling each autonomous dump truck to travel a specified route to the dump site and for generating a queue position request upon approach to the dump site; and queue manager means for establishing a queue to control access to the dump site, and for generating a queue position in response to receipt of said queue position request from an approaching autonomous dump truck;

wherein said navigator means instructs said approaching autonomous dump truck to take said queue position, and wherein said plurality of autonomous dump trucks are permitted to flow in and out of said queue and to access said dump site in a first-in, first-out manner.

38. The system of claim 37, further comprising:

dump site control means for selectively producing a blocking signal to prevent autonomous dump trucks in said queue from accessing said dump site.

39. The system of claim 38, further comprising:

communication means for providing communications between said navigator means and said queue manager means and between said dump site control means and said navigator means.

40. The system of claim 39, wherein said communication means comprises:

first radio providing communications between said navigator means and said queue manager means; and second radio providing communications between said queue manager means and said dump site control means.

* * * * *